United States Patent

Marti

Patent Number: 5,462,195
Date of Patent: Oct. 31, 1995

[54] DEVICE FOR MOUNTING A HANDLE TO A PAN BODY

[75] Inventor: Hans-Rudolf Marti, Glarus, Switzerland

[73] Assignee: A. & J. Stockli AG, Netstal, Switzerland

[21] Appl. No.: 297,635

[22] Filed: Aug. 29, 1994

[30] Foreign Application Priority Data

Oct. 28, 1993 [CH] Switzerland ........................ 03272/93

[51] Int. Cl.$^6$ ................................................. B65D 25/28
[52] U.S. Cl. ................................. 220/752; 220/759
[58] Field of Search ........................... 220/752, 759, 220/775, 776

[56] References Cited

U.S. PATENT DOCUMENTS

| | | | |
|---|---|---|---|
| 4,008,822 | 2/1977 | Carroll | 220/752 |
| 4,032,032 | 6/1977 | Carroll et al. | 220/752 |
| 4,083,081 | 4/1978 | Witte | 220/752 |
| 4,127,914 | 12/1978 | Fischbach | 220/752 |
| 4,781,302 | 11/1988 | Pearson | 220/752 |

FOREIGN PATENT DOCUMENTS 2383638 3/1977 France.

*Primary Examiner*—Joseph Man-Fu Moy
*Attorney, Agent, or Firm*—Ladas & Parry

[57] ABSTRACT

The pan body includes a mounting member which is welded thereto. This mounting member includes a stub with a transverse bore. The handle includes a sleeve section and a curvilinear transverse wall is welded into the sleeve section. The handle is placed with its transverse wall onto the stub and is held in this state by means of a transverse pin. The originally rectilinear transverse pin is bent due to the concave surface area of the transverse wall and urges thereby the handle against and onto the pan body.

8 Claims, 1 Drawing Sheet

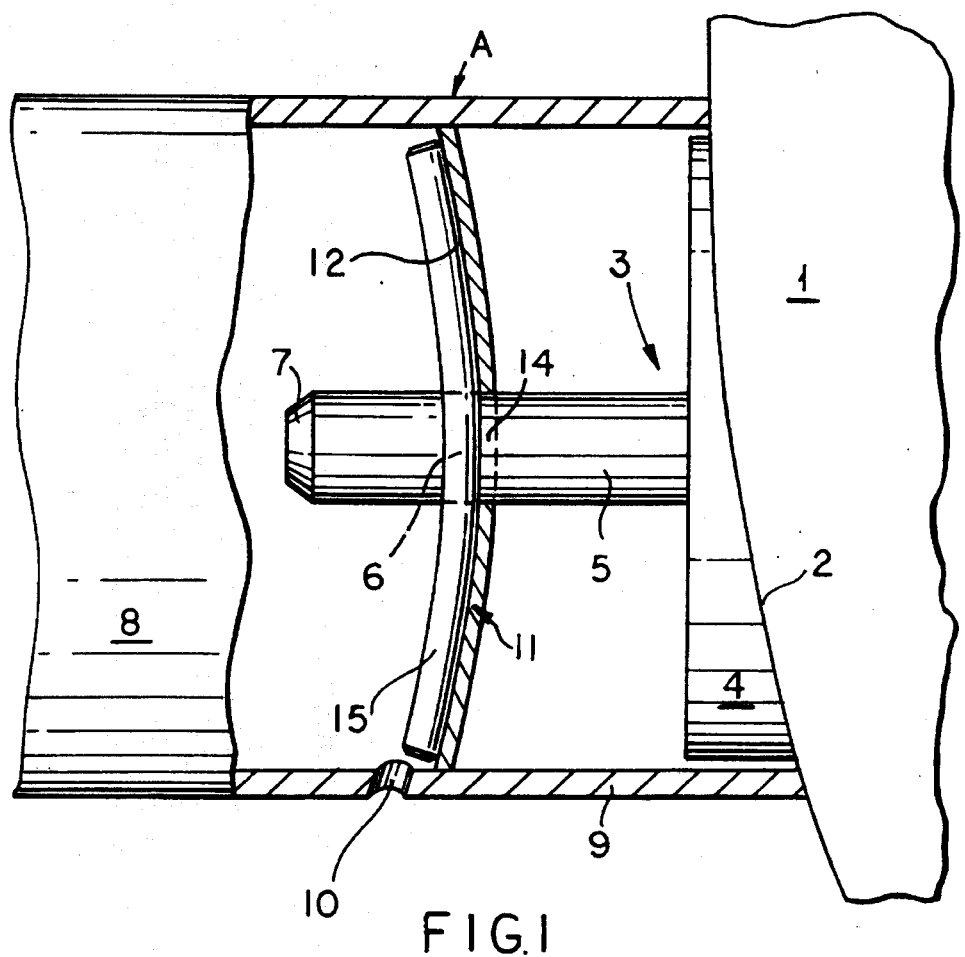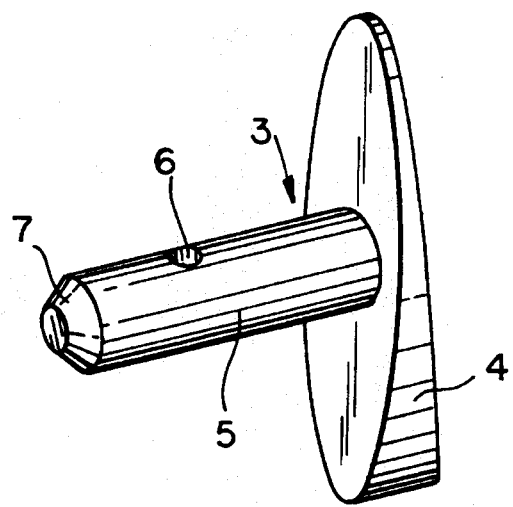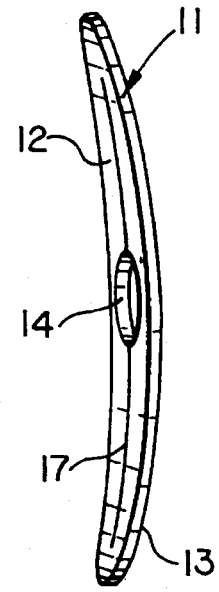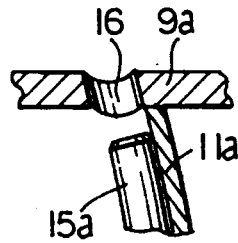

DEVICE FOR MOUNTING A HANDLE TO A PAN BODY

BACKGROUND OF THE INVENTION

1. Field of the Invention

The present invention relates to a device for mounting a handle to a pan body, which pan body has an outer surface, including a mounting member adapted to be mounted to said outer surface of the pan body in an unreleasable manner, which handle includes a sleeve section embracing said mounting member, and including a means for mounting said handle onto said mounting member.

2. Description of the Prior Art

The mounting member of a known device of the kind set forth above includes an inner thread and a through bore extends through the handle in its longitudinal direction. In order to mount the handle to the mounting member use is made of an extremely long threaded bolt which projects through the handle, whereby the bolt head rests against the handle and the threaded bolt is screwed into the inner thread of the mounting member. This design of mounting is not very rigid because after a certain time the extremely long screw bolt gets loosened and, therefore, must always again be tightened. Often it occurs additionally that after a longer time of use when the screw bolt got loose somewhat, the threads rust such that then the screw bolt cannot be tightened completely at all. Furthermore, the pressing force of the handle against the pan body depends solely on the tightening force exerted on the screw bolt such that after the screw bolt has been tightened several times and with a large force, the head of the screw bolt is often damaged additionally.

SUMMARY OF THE INVENTION

Therefore, it is a general object of the invention to provide a device for mounting a handle to a pan body where no loosening or damaging of its structural members occur.

A further object is to provide a device, in which the mounting member comprises a stub projecting towards the handle and includes a transverse bore and in which the sleeve section comprises a curvilinear transverse wall including a concave surface area and a thereto opposite convex surface area, which transverse wall has a perforation and a transverse pin, which transverse wall is seated by its perforation in such a manner on the stub that in the mounted state of the handle its transverse wall is located adjacent the transverse bore and its pin is seated in the transverse bore and rests against the concave surface area of the curvilinear transverse wall.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is a vertical section through the device structured in accordance with the present invention, whereby the pan is set onto a support;

FIG. 2 is a perspective view of a mounting member of the device;

FIG. 3 is a perspective view of a curvilinear transverse wall of the device; and FIG. 4 illustrates a modified embodiment of detail A of FIG. 1.

DESCRIPTION OF THE PREFERRED EMBODIMENT

The pan body 1 of the illustrated embodiment features an outer contour 2 which extends curvilinearly downwards. Because the pan body 1 has in most cases a circular cross section, the pan body 1 includes a further curvilinear area which is not particularly illustrated in the drawings. A mounting member 3 is designed to correspond to mentioned curvilinear area and also the outer contour 2 by its transverse plate 4 and is welded thereto. The mounting member 3 includes, furthermore, a stub 5 formed integrally with the transverse plate 4 and projecting from this plate 4. The stub 5 includes a transverse bore 6 and features at its free end a chamfered area 7 (FIG. 2). This mounting member 3 illustrated in FIG. 2 is, therefore, mounted to the outer surface of the pan body 1 in an unreleasable manner.

A handle 8 includes a sleeve section 9, which consists e.g. of a sheet metal, whereby its cross-sectional shape can have various designs, it may be, for instance, rectangular, circular or elliptical. Furthermore, the sleeve section 9 can be designed in various manners; it can be a closed pipe or can be also not be closed such that the sleeve section is slit at its lower area. The sleeve section 9 includes at least one lateral opening 10. A curvilinear transverse wall 11 is mounted in the sleeve section 9, e.g. by a welding (laser welding). When the pan body is set onto a support such as depicted in FIG. 1, the curvilinear area of the transverse wall 11 of the illustrated example extends in a vertical direction. The transverse wall 11 includes, therefore, a concave surface area 12 and a convex surface area 13. The transverse wall 11 includes a perforation 14.

The transverse plate 4 of the mounting member 3 of the illustrated example is of an oval shape, thus of an elliptical shape (FIG. 2), such that in this case also the sleeve section 9 is of an elliptical shape, such that it can be set by its front end surface over the transverse plate 4 and abuts the outer contour surface 2 of the pan body (FIG. 1). The elliptical shaped sleeve section includes in this case also an elliptic transverse wall 11 (FIG. 3).

The mounting device for mounting the handle to the pan body consists of a transverse pin 15, which is made e.g. of steel, but also could consist of a plastic material. Furthermore, this transverse pin 15 can operate as elastic rod, such it can be bent in a spring elastic manner. In its rest position the transverse pin 15 extends rectilinearly.

The mounting of the handle 8 to the pan body 1 proceeds as follows:

The handle 8 is set with its sleeve section 9 and its transverse wall 11 onto the stub 5, whereby accordingly the stub 5 projects through the perforation 14, and thereafter the sleeve section 9 is pushed over the transverse wall 4 and abuts the outer contour surface 2 of the pan body 1. Now, the rectilinear transverse pin 15 is driven by means of a tool through the lateral opening 10 and into the transverse bore 6 of the stub 5. The transverse pin 15 abuts now more or less the concave surface area 12 of the transverse wall 11 and is urged into a curvilinear state such as illustrated in FIG. 1. Because as shown in FIG. 1 the lateral opening 10 is located somewhat staggered relative to the longitudinal extent of the mounted transverse pin 15, the transverse pin 15 snaps in its finally mounted state onto the transverse wall 11 and is therefore located protected within the sleeve section 9 and cannot be removed therefrom without any further ado. Now, the handle 8 is firmly mounted to the pan body 1 without any play. Should it be desired to allow the handle 8 to be easily again removed from the pan body 1, such object can be arrived at by a structure in accordance with detail A of FIG. 1 depicted in FIG. 4. In such a case the sleeve section 9a includes a transverse opening 16, which is located at the area of the longitudinal extent of the transverse pin 15a such that by means of a tool inserted into the other (second) transverse opening 10 the transverse pin 15a abutting transverse wall 11a can be driven from the inner space of the sleeve section 9a towards the outside and removed therefrom, such that the handle 8 can be detached from the pan body.

FIG. 3 illustrates that the extent of the curvature of the elliptical transverse wall 11 extends along the transverse axis of the ellipse. FIG. 1 illustrates that the transverse wall 11 is located directly adjacent the transverse bore 6. This must, however, not always be a precise state, i.e. due to manufacturing tolerances the transverse wall could also be located at a small distance from the perforation. In such case the transverse pin 15 is bent to a lesser extent, abuts, however, still the transverse wall 11 in a spring elastic manner. Therefore, due to this spring elastic abutting of the transverse pin 15 at the transverse wall 11, the grip is always pressed with its sleeve section 9 in a spring elastic manner onto the pan body 1.

According to the illustrated embodiment the convex surface area 13 of the transverse wall 11 faces the pan body 1.

Thus, the mounting of the handle to the pan body at the example illustrated in FIG. 1 proceeds in that the transverse pin 15 which is seated in the stub 5 presses the handle via the transverse wall 11 over the sleeve section 9 onto the pan body 1 in a spring elastic manner. The same spring elastic mounting could be made at a further embodiment also in such a manner that the sleeve section would be hooked by a hook shaped end into recesses in the transverse plate 4 and a pulling force would be exerted onto the sleeve section 9 by means of the transverse pin 15. In such a case the lateral wall 11 would be mounted in such a manner to the sleeve section 9 that its concave surface area 12 is located between the transverse plate 4 and the transverse wall 11. In case of such a design the transverse pin 15 would urge the transverse plate 4 to the left when viewed in FIG. 1.

The transverse wall 11 can include a groove 17, in which the transverse pin can glide into the position illustrated in FIG. 1 upon its being driven in.

The transverse pin 15 can have e.g. a circular or rectangular cross-sectional shape. The transverse bore 6 in the stub 5 has the same cross-sectional shape as the transverse pin 15.

While there are shown and described present preferred embodiments of the invention, it is to be distinctly understood that the invention is not limited thereto, but may be otherwise variously embodied and practiced within the scope of the following claims.

I claim:

1. A device for mounting a handle to a pan body, which pan body has an outer surface, including a mounting member adapted to be mounted to said outer surface of the pan body in an unreleasable manner, which handle includes a sleeve section embracing said mounting member, and including a means for mounting said handle onto said mounting member, said mounting member comprising a stub projecting towards the handle and including a transverse bore and said sleeve section comprising a curvilinear transverse wall including a concave surface area and a thereto opposite convex surface area, which transverse wall has a perforation and a transverse pin, which transverse wall is seated by its perforation in such a manner on said stub that in the mounted state of the handle its transverse wall is located adjacent the transverse bore and its pin is seated in the transverse bore and rests against the concave surface area of the curvilinear transverse wall.

2. The device of claim 1, in which said transverse wall includes a convex surface area which in the mounted state of the handle faces the pan body.

3. The device of claim 1, in which said sleeve section comprises at least a first lateral opening through which the transverse pin may be inserted into the inner space of the sleeve section and into the transverse bore of the stub.

4. The device of claim 1, in which said sleeve section includes a first and a second transverse opening, of which the second transverse opening is adapted to guide the transverse pin from the inner space of the sleeve section towards the outside.

5. The device of claim 1, in which said sleeve section has an elliptical cross-sectional shape defining an ellipse with a transverse and a conjugate axis, into which sleeve section an elliptical transverse wall is inserted, and in which the extent of the curvature of the elliptical transverse wall coincides with the transverse axis of the ellipse.

6. The device of claim 1, in which said mounting member includes a transverse plate extending perpendicularly to its stub, which transverse plate features at its side facing away from the stub a curvature which corresponds to the shape of the outer surface of the pan body.

7. The device of claim 1, in which the transverse wall is welded into the sleeve section.

8. The device of claim 1, in which said transverse pin is designed as a spring elastical flexible rod.

* * * * *